United States Patent
Suga et al.

(10) Patent No.: US 8,462,896 B2
(45) Date of Patent: Jun. 11, 2013

(54) RECEIVING APPARATUS, TRANSMITTING APPARATUS, RECEPTION METHOD, AND TRANSMISSION METHOD

(75) Inventors: Junichi Suga, Kawasaki (JP); Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/554,550

(22) Filed: Jul. 20, 2012

(65) Prior Publication Data

US 2012/0288020 A1    Nov. 15, 2012

Related U.S. Application Data

(60) Division of application No. 12/887,937, filed on Sep. 22, 2010, now Pat. No. 8,254,501, which is a continuation of application No. PCT/JP2008/056386, filed on Mar. 31, 2008.

(51) Int. Cl.
 *H04L 27/06* (2006.01)
 *H03D 1/00* (2006.01)

(52) U.S. Cl.
 USPC ............ 375/340; 375/219; 375/316; 375/324

(58) Field of Classification Search
 USPC .................................. 375/219, 316, 324, 340
 See application file for complete search history.

(56) References Cited

U.S. PATENT DOCUMENTS

| | | | |
|---|---|---|---|
| 2002/0010001 A1* | 1/2002 | Dahlman et al. | 455/522 |
| 2002/0183020 A1* | 12/2002 | Zhu et al. | 455/108 |
| 2005/0063336 A1* | 3/2005 | Kim et al. | 370/329 |
| 2005/0078759 A1 | 4/2005 | Zhang | |
| 2005/0163067 A1 | 7/2005 | Okamoto et al. | |
| 2007/0121547 A1 | 5/2007 | Huh et al. | |
| 2007/0171996 A1 | 7/2007 | Miyabayashi | |
| 2007/0173208 A1 | 7/2007 | Nishio et al. | |

FOREIGN PATENT DOCUMENTS

| | | |
|---|---|---|
| CN | 1926785 A | 3/2007 |
| JP | 2003304214 | 10/2003 |
| JP | 2005294997 | 10/2005 |
| JP | 2007201725 | 8/2007 |

OTHER PUBLICATIONS

First Notification of Office Action dated Oct. 10, 2012 in Chinese Patent Application No. 200880128241.7.

Extended European Search Report dated Dec. 6, 2012 in the corresponding European Patent Application No. 08739499.5-2415 / 2265043.

(Continued)

*Primary Examiner* — Ted Wang
(74) *Attorney, Agent, or Firm* — Smith, Gambrell & Russell, LLP

(57) ABSTRACT

A reception unit receives data from communication apparatuses. A transmission unit transmits data to the communication apparatuses. A control unit determines, in an adaptive way, which modulation and coding schemes to use to transmit and receive data. At a first stage, a modulation and coding scheme with a low transmission rate or a modulation and coding scheme that minimizes power requirements is selected from among a plurality of candidates therefor. At a second stage, the modulation and coding scheme of at least one of the communication apparatuses is changed to another scheme having a higher transmission rate, when it is impossible to allocate sufficient resources for the modulation and coding schemes selected at the first stage.

5 Claims, 23 Drawing Sheets

OTHER PUBLICATIONS

Cheong Yui Wong, et al. "Multiuser OFDM with Adaptive Subcarrier, Bit, and Power Allocation" IEEE Journal on Selected Areas in Communications, IEEE Service Center, Piscataway, US, vol. 17. No. 10. Oct. 1, 1999 p. 1747 and 1748.

Peter S. Chow, et al. A Practical Discrete Multitone Transceiver Loading Algorithm for Data Transmission over Spectrally Shaped Channels. IEEE Transactions on Communications, IEEE service center, piscataway, NJ. USA, vol. 43, No. 2/04, Part 02, Feb. 1, 1995 pp. 773-775.

International Search Report dated Jul. 1, 2008 in corresponding International application No. PCT/JP2008/056386.

IEEE Standard for Local and metropolitan area networks Part 16: Air Interface for Fixed Broadband Wireless Access Systems IEEE Computer Society and the IEEE Microwave Theory and Techniques Society dated Oct. 1, 2004.

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 dated Feb. 28, 2006.

Notice of Allowance dated May 11, 2012 in U.S. Appl. No. 121887,937.

Notice of Allowance dated Feb. 20, 2013 received in U.S. Appl. No. 13/554,403.

* cited by examiner

FIG. 5

| UL-MAP DATA | |
|---|---|
| CID | 16 bits |
| UIUC | 4 bits |
| Duration | 10 bits |
| Repetition Coding Indication | 2 bits |

FIG. 6

| DL-MAP DATA | |
|---|---|
| CID | 16 bits |
| DIUC | 4 bits |
| Symbol Offset | 6 bits |
| Subchannel Offset | 6 bits |
| Boosting | 3 bits |
| No. Symbols | 7 bits |
| No. Subchannels | 6 bits |
| Repetition Coding Indication | 2 bits |

FIG. 7

| | PROFILE CANDIDATE TABLE | 131 |
|---|---|---|
| UIUC/ DIUC | MODULATION AND CODING SCHEME | SINR THRESHOLD |
| 1 | QPSK (CC) 1/2 | 3 dB |
| 2 | QPSK (CC) 2/3 | 5 dB |
| 3 | QPSK (CC) 3/4 | 7 dB |
| 4 | 16QAM (CC) 1/2 | 9 dB |
| 5 | 16QAM (CC) 2/3 | 11 dB |
| 6 | 16QAM (CC) 3/4 | 14 dB |

FIG. 8

| MOBILE STATION DATA TABLE | | | | 132 |
|---|---|---|---|---|
| MOBILE STATION ID | TRANSMISSION POWER | MAXIMUM TRANSMISSION POWER | SINR | |
| MS1 | 2 dBm | 20 dBm | 15 dB | |
| MS2 | 3 dBm | 8 dBm | 14 dB | |
| MS3 | 5 dBm | 12 dBm | 9 dB | |
| MS4 | 3 dBm | 16 dBm | 14 dB | |

FIG. 9

| DATA TRAFFIC SIZE TABLE | | | 133 |
|---|---|---|---|
| MOBILE STATION ID | UL DATA | DL DATA | |
| MS1 | 192 bytes | 384 bytes | |
| MS2 | 128 bytes | 256 bytes | |
| MS3 | 96 bytes | 192 bytes | |
| MS4 | 48 bytes | 96 bytes | |

| POWER REQUIREMENT TABLE (MS1) | | | |
|---|---|---|---|
| PROFILE | SUBCHANNELS | UNIT POWER REQUIREMENT | TOTAL POWER REQUIREMENT |
| QPSK (CC) 1/2 | 8 | 2 dBm | 11 dBm |
| QPSK (CC) 2/3 | 6 | 3.5 dBm | 11.3 dBm |
| QPSK (CC) 3/4 | 6 | 5 dBm | 12.7 dBm |
| 16QAM (CC) 1/2 | 4 | 8 dBm | 14 dBm |
| 16QAM (CC) 2/3 | 4 | 10.5 dBm | 16.5 dBm |
| 16QAM (CC) 3/4 | 4 | 11 dBm | 17 dBm |

FIG. 15

| UL PROFILE SETUP TABLE ||||
|---|---|---|---|
| MOBILE STATION ID | PROFILE | UNIT POWER REQUIREMENT | SLOT ALLOCATION |
| MS1 | QPSK (CC) 1/2 | 2 dBm | 32 |
| MS2 | QPSK (CC) 2/3 | 4.5 dBm | 16 |
| MS3 | QPSK (CC) 1/2 | 5 dBm | 16 |
| MS4 | QPSK (CC) 1/2 | 3 dBm | 8 |

| MOBILE STATION ID | PROFILE | UNIT POWER REQUIREMENT | SLOT ALLOCATION |
|---|---|---|---|
| MS1 | QPSK (CC) 1/2 | 2 dBm | 32 |
| MS2 | QPSK (CC) 2/3 | 4.5 dBm | 16 |
| MS3 | QPSK (CC) 1/2 | 5 dBm | 16 |
| MS4 | QPSK (CC) 1/2 | 3 dBm | 8 |

135b

| MOBILE STATION ID | PROFILE | UNIT POWER REQUIREMENT | SLOT ALLOCATION |
|---|---|---|---|
| MS1 | QPSK (CC) 2/3 | 3.5 dBm | 24 |
| MS2 | QPSK (CC) 2/3 | 4.5 dBm | 16 |
| MS3 | QPSK (CC) 1/2 | 5 dBm | 16 |
| MS4 | QPSK (CC) 1/2 | 3 dBm | 8 |

135c

| MOBILE STATION ID | PROFILE | UNIT POWER REQUIREMENT | SLOT ALLOCATION |
|---|---|---|---|
| MS1 | QPSK (CC) 2/3 | 3.5 dBm | 24 |
| MS2 | QPSK (CC) 2/3 | 4.5 dBm | 16 |
| MS3 | QPSK (CC) 1/2 | 5 dBm | 16 |
| MS4 | QPSK (CC) 2/3 | 4.5 dBm | 6 |

| MOBILE STATION ID | PROFILE | UNIT POWER REQUIREMENT | SLOT ALLOCATION |
|---|---|---|---|
| MS1 | QPSK (CC) 1/2 | 2 dBm | 32 |
| MS2 | QPSK (CC) 1/2 | 3 dBm | 22 |
| MS3 | QPSK (CC) 1/2 | 5 dBm | 16 |
| MS4 | QPSK (CC) 1/2 | 3 dBm | 8 |

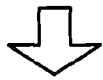

135e

| MOBILE STATION ID | PROFILE | UNIT POWER REQUIREMENT | SLOT ALLOCATION |
|---|---|---|---|
| MS1 | 16QAM (CC) 3/4 | 11 dBm | 11 |
| MS2 | QPSK (CC) 1/2 | 3 dBm | 22 |
| MS3 | QPSK (CC) 1/2 | 5 dBm | 16 |
| MS4 | QPSK (CC) 1/2 | 3 dBm | 8 |

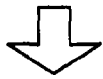

135f

| MOBILE STATION ID | PROFILE | UNIT POWER REQUIREMENT | SLOT ALLOCATION |
|---|---|---|---|
| MS1 | 16QAM (CC) 3/4 | 11 dBm | 11 |
| MS2 | QPSK (CC) 3/4 | 6 dBm | 15 |
| MS3 | QPSK (CC) 1/2 | 5 dBm | 16 |
| MS4 | QPSK (CC) 1/2 | 3 dBm | 8 |

FIG. 20

| DL PROFILE SETUP TABLE | | | | 136 |
|---|---|---|---|---|
| PROFILE | MOBILE STATION ID | TOTAL DATA SIZE | SUB-CHANNELS |
| QPSK (CC) 1/2 | MS1, MS2, MS3, MS4 | 928 bytes | 11 |
| QPSK (CC) 2/3 | | 0 bytes | 0 |
| QPSK (CC) 3/4 | | 0 bytes | 0 |
| 16QAM (CC) 1/2 | | 0 bytes | 0 |
| 16QAM (CC) 2/3 | | 0 bytes | 0 |
| 16QAM (CC) 3/4 | | 0 bytes | 0 |

| PROFILE | MOBILE STATION ID | TOTAL DATA SIZE | SUB-CHANNELS |
|---|---|---|---|
| QPSK (CC) 1/2 | MS1, MS2, MS3, MS4 | 928 bytes | 11 |
| QPSK (CC) 2/3 | | 0 bytes | 0 |
| QPSK (CC) 3/4 | | 0 bytes | 0 |
| 16QAM (CC) 1/2 | | 0 bytes | 0 |
| 16QAM (CC) 2/3 | | 0 bytes | 0 |
| 16QAM (CC) 3/4 | | 0 bytes | 0 |

| PROFILE | MOBILE STATION ID | TOTAL DATA SIZE | SUB-CHANNELS |
|---|---|---|---|
| QPSK (CC) 1/2 | MS2, MS3, MS4 | 544 bytes | 7 |
| QPSK (CC) 2/3 | MS1 | 384 bytes | 4 |
| QPSK (CC) 3/4 | | 0 bytes | 0 |
| 16QAM (CC) 1/2 | | 0 bytes | 0 |
| 16QAM (CC) 2/3 | | 0 bytes | 0 |
| 16QAM (CC) 3/4 | | 0 bytes | 0 |

136c

| PROFILE | MOBILE STATION ID | TOTAL DATA SIZE | SUB-CHANNELS |
|---|---|---|---|
| QPSK (CC) 1/2 | MS1, MS2, MS3, MS4 | 928 bytes | 11 |
| QPSK (CC) 2/3 | | 0 bytes | 0 |
| QPSK (CC) 3/4 | | 0 bytes | 0 |
| 16QAM (CC) 1/2 | | 0 bytes | 0 |
| 16QAM (CC) 2/3 | | 0 bytes | 0 |
| 16QAM (CC) 3/4 | | 0 bytes | 0 |

136d

| PROFILE | MOBILE STATION ID | TOTAL DATA SIZE | SUB-CHANNELS |
|---|---|---|---|
| QPSK (CC) 1/2 | MS2, MS3, MS4 | 544 bytes | 7 |
| QPSK (CC) 2/3 | | 0 bytes | 0 |
| QPSK (CC) 3/4 | | 0 bytes | 0 |
| 16QAM (CC) 1/2 | | 0 bytes | 0 |
| 16QAM (CC) 2/3 | | 0 bytes | 0 |
| 16QAM (CC) 3/4 | MS1 | 384 bytes | 2 |

RECEIVING APPARATUS, TRANSMITTING APPARATUS, RECEPTION METHOD, AND TRANSMISSION METHOD

This application is a continuation of U.S. application Ser. No. 12/887,937, filed Sep. 22, 2010, now U.S. Pat. No. 8,254, 501, which is a continuation, filed under 35 U.S.C. §111(a), of International Application PCT/JP2008/056386, filed Mar. 31, 2008.

FIELD

The present invention relates to a receiving apparatus, transmitting apparatus, reception method, and transmission method.

BACKGROUND

Point-to-multipoint (1:n) communications systems are now prevalent in the field of wireless communication, which allow one device to communicate with two or more devices simultaneously. The existing standards for such 1:n wireless communication include, for example, IEEE 802.16d defining fixed wireless access systems and IEEE 802.16e defining mobile wireless access systems (see, for example, the following Literatures 1 and 2). In this section, the term "radio base station" is used to refer to a device that can communicate simultaneously with a plurality of devices, and the term "mobile stations" to refer to the devices that communicate with the radio base station.

Literature 1: The Institute of Electrical and Electronics Engineers (IEEE), "IEEE Standard for Local and Metropolitan Area Networks Part 16: Air Interface for Fixed Broadband Wireless Access Systems," IEEE 802.16-2004.

Literature 2: The Institute of Electrical and Electronics Engineers (IEEE), "IEEE Standard for Local and Metropolitan Area Networks Part 16: Air Interface for Fixed and Mobile Broadband Wireless Access Systems," IEEE 802.16e-2005.

Many of the 1:n wireless communication systems are designed to operate under the primary control of radio base stations. For example, the allocation of radio resources used in communication between a radio base station and mobile stations is centrally managed by the radio base station. Here the radio base station may use an adaptive modulation and coding (AMC) technique to enhance the efficiency of wireless communication. With AMC, the radio base station dynamically determines which modulation and coding scheme (MCS) to use to communicate with a mobile station, depending on the current quality of radio links between the radio base station and the mobile station.

A modulation and coding scheme specifies, for example, a modulation method, a coding method, and a coding rate. By combining different options for those elements, a number of candidates for the modulation and coding scheme are made available. Each such candidate has a different transmission rate, or in other words, each candidate transports a different amount of data per unit radio resource. The radio base station is supposed to select an appropriate modulation and coding scheme for individual mobile stations, from among those having different transmission rates. For example, it may be appropriate to select a modulation and coding scheme with a high transmission rate for mobile stations having a high radio link quality. It may also be appropriate to select a modulation and coding scheme with a low transmission rate for mobile stations having a low radio link quality, because such mobile stations would otherwise encounter more frequent data errors and consequent instability of communication.

Mobile communications systems may use multicarrier modulation techniques, in which case the modulation method and coding rate are selected based on power levels of subcarriers. Specifically, the radio base station measures the power level of each received subcarrier signal and selects a set of subcarriers capable of achieving a certain grade of transmission rate. The radio base station then determines which modulation method and coding rate to use, according to the receive power level of the selected subcarriers (see, for example, Japanese Laid-open Patent Publication No. 2003-304214).

While the modulation and coding schemes selected in the above-described adaptive modulation and coding may be advantageous to the radio base station itself, it does not always mean that the same schemes are also advantageous to mobile stations.

More specifically, the radio base station will be able to transmit the same amount data with a fewer radio resources and thus increase the number of simultaneous communication sessions, by applying a modulation and coding scheme with a high transmission rate to mobile stations with a high link quality. This means that, from the viewpoint of radio base stations, it is more advantageous to select a modulation and coding scheme with as high a transmission rate as possible.

The mobile stations, on the other hand, have to raise their output power to transmit data to the radio base station by using a modulation and coding scheme with a high transmission rate. This leads to an increased power consumption in the mobile stations. The use of a modulation and coding scheme with a high transmission rate also affects the reception of data from the radio base station. That is, the probability of successful reception is reduced as the transmission rate increases. This means that, from the viewpoint of mobile stations, it is more advantageous to select a modulation and coding scheme with a lower transmission rate, even under the condition of good radio link quality.

SUMMARY

According to an aspect of the invention, a receiving apparatus that specifies modulation and coding schemes respectively for a plurality of transmitting apparatuses and receives data that the transmitting apparatuses transmit by using the specified modulation and coding schemes, the receiving apparatus includes: a control unit that collects information on the amount of data to be transmitted by each transmitting apparatus; selects, for each individual transmitting apparatus, a modulation and coding scheme that transports a smaller amount of data per unit resource than the other modulation and coding schemes, from among a plurality of candidates for the modulation and coding schemes; determines whether necessary resources are allocable for reception of the data to be transmitted from the transmitting apparatuses, based on the amount of the data to be transmitted and the selected modulation and coding schemes; and when the resources are unallocable, changes the currently selected modulation and coding scheme of at least one of the transmitting apparatuses to another modulation and coding scheme that transports a larger amount of data per unit resource than the currently selected modulation and coding scheme.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 5 illustrates a data structure of UL-MAP data;

FIG. 6 illustrates a data structure of DL-MAP data;

FIG. 7 illustrates a data structure of a profile candidate table;

FIG. 8 illustrates a data structure of a mobile station data table;

FIG. 9 illustrates a data structure of a data traffic size table;

FIG. 14 illustrates a data structure of a power requirement table;

FIG. 15 illustrates a data structure of a UL profile setup table;

FIG. 16 schematically illustrates a flow of the first UL profile setup process;

FIG. 18 schematically illustrates a flow of the second UL profile setup process;

FIG. 20 illustrates a data structure of a DL profile setup table;

DESCRIPTION OF EMBODIMENT(S)

The present embodiment will now be described in detail below with reference to the accompanying drawings.

Figure 1:
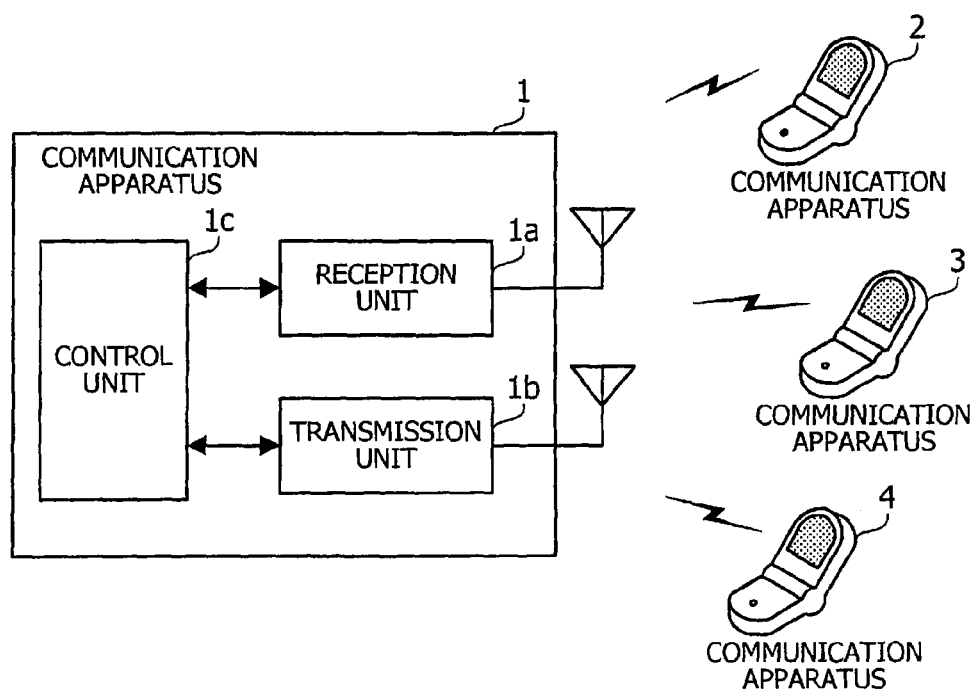
FIG. 1 provides an overview of the present embodiment.

FIG. 1 provides an overview of the present embodiment. The communications system illustrated in FIG. 1 includes communication apparatuses 1, 2, 3, and 4. The communication apparatus 1 can communicate with other communication apparatuses 2, 3, and 4 simultaneously. For example, the communication apparatus 1 may be a radio base station, and the communication apparatuses 2, 3, and 4 may be mobile stations. The communication apparatus 1 is formed from a reception unit 1a, a transmission unit 1b, and a control unit 1c.

The reception unit 1a receives signals from communication apparatuses 2, 3, and 4, which carry payload data and control information. The reception unit 1a then demodulates and decodes the received signals so as to extract the payload data and control information. During this course, the control unit 1c specifies several parameters indicating which modulation and coding schemes to use, depending on with which apparatus the communication apparatus 1 is to communicate. The reception unit 1a executes demodulation and decoding operations by using the methods according to the specified parameters. When control information is extracted, the reception unit 1a supplies that extracted information to the control unit 1c. What is received as control information may include, for example, transmission power levels of the communication apparatuses 2, 3, and 4 and measurement results of receive signal quality of the same. The control information may also include information indicating the amount of data that the communication apparatuses 2, 3, and 4 are to transmit.

The transmission unit 1b performs modulation and coding of payload data and control information to be transmitted to the communication apparatuses 2, 3, and 4, thereby producing transmit signals. The transmission unit 1b then transmits those transmit signals to the communication apparatuses 2, 3, and 4. During this course, the control unit 1c specifies several parameters indicating which modulation and coding schemes to use, depending on with which apparatus the communication apparatus 1 is to communicate. The transmission unit 1b executes modulation and coding by using the methods according to the specified parameters. What is transmitted as control information may include information specifying modulation and coding schemes that the communication apparatuses 2, 3, and 4 are supposed to use when they transmit data.

The control unit 1c manages resources used for uplink communication (i.e., the communication in the direction from the communication apparatuses 2, 3, and 4 to the communication apparatus 1) to control the reception unit 1a and its reception operation. Also the control unit 1c manages resources used for downlink communication (i.e., the communication in the direction from the communication apparatus 1 to the communication apparatuses 2, 3, and 4) to control the transmission unit 1b and its transmission processing. During this course, the control unit 1c controls the operation of adaptive modulation and coding. More specifically, the control unit 1c dynamically determines which modulation and coding scheme to use for communication with each individual communication apparatus 2, 3, and 4, by consulting the control information supplied from the reception unit 1a as necessary.

In uplink communication, the control unit 1c first makes a provisional selection of a modulation and coding scheme for each individual communication apparatus 2, 3, and 4 from among a plurality of candidate modulation and coding schemes, according to a first selection method. An example of the first selection method is to choose a modulation and coding scheme with the lowest transmission rate. Another example of the first selection method is to choose a modulation and coding scheme that minimizes the total transmission power of communication apparatuses 2, 3, and 4. Subsequently the control unit 1c determines whether it is possible to allocate resources necessary for receiving all data that the communication apparatuses 2, 3, and 4 are going to transmit, assuming the use of the modulation and coding scheme that has been provisionally selected with the first selection method.

When it is found possible to allocate such resources, the control unit 1c chooses and uses the provisionally selected modulation and coding scheme as the final selection. When it is found impossible to allocate all necessary resources, the control unit 1c uses a second selection method to change the modulation and coding scheme of at least one of the communication apparatuses 2, 3, and 4. One example of the second selection method is to select new modulation and coding schemes by raising the transmission rate in a stepwise manner, with respect to the provisional modulation and coding scheme, until it is determined that all necessary resources can be allocated. Another example of the second selection method is to select a modulation and coding scheme with the highest transmission rate of all those that can be applied. The control unit 1c then applies the modulation and coding scheme that it has selected with the second selection method. It is noted that the control unit 1c determines which communication apparatuses should be subjected to the change of modulation and coding schemes. For example, the control unit 1c may select a communication apparatus with a smaller transmission power level in preference to others.

Also in downlink communication, the control unit 1c first makes a provisional selection of a modulation and coding scheme for each individual communication apparatus 2, 3, and 4 from among a plurality of candidate modulation and coding schemes, according to a first selection method. For example, the first selection method may be to choose a modulation and coding scheme with the lowest transmission rate. Subsequently the control unit 1c determines whether it is possible to allocate resources necessary for transmitting all data destined for the communication apparatuses 2, 3, and 4, assuming the use of the provisional modulation and coding schemes that it has selected with the first selection method.

When it is found possible to allocate such resources, the control unit 1c chooses and uses the provisional modulation and coding schemes as the final selection. When it is found impossible to allocate all necessary resources, the control unit 1c uses a second selection method to change the modulation and coding scheme of at least one of the communication apparatuses 2, 3, and 4. The second selection method described above for the uplink communication may serve for this downlink communication as well. The control unit is then applies the modulation and coding scheme that it has selected with the second selection method. It is noted that, to apply the change of modulation and coding schemes, the control unit 1c may select a communication apparatus with a higher level of receive signal quality in preference to others.

The above description assumes that the communication apparatus 1 incorporates both receive and transmit functions. It is also possible, however, to implement these functions separately in a receiving apparatus and a transmitting apparatus. When this is the case, the receiving apparatus and transmitting apparatus may have their own control units for adaptive modulation and coding. The above description also assumes that different modulation and coding schemes are selected for uplink communication and downlink communication. The control unit 1c may, however, be configured to use the same modulation and coding scheme for both uplink communication and downlink communication.

In operation of the above-described communications system, a provisional modulation and coding scheme is selected for uplink communication of each communication apparatus 2, 3, and 4, from among a plurality of candidate modulation and coding schemes, in favor of those having lower transmission rates or smaller transmission power levels. Then based on the amount of data to be transmitted from each communication apparatus 2, 3, and 4, as well as on the selected provisional modulation and coding schemes, it is determined whether resources can be allocated for simultaneous reception of data from those communication apparatuses 2, 3, and 4. When it is not possible to allocate all necessary resources, the provisional modulation and coding scheme of at least one of the communication apparatuses is changed to another scheme that has a higher transmission rate.

For downlink communication, a provisional modulation and coding scheme is selected for each communication apparatus 2, 3, and 4 from among a plurality of candidate modulation and coding schemes, in favor of those having lower transmission rates. Then based on the amount of data to be transmitted to individual communication apparatuses 2, 3, and 4, as well as on the selected provisional modulation and coding schemes, it is determined whether resources can be allocated for simultaneous transmission of data to those communication apparatuses 2, 3, and 4. When it is not possible to allocate all necessary resources, the provisional modulation and coding scheme of at least one of the communication apparatuses is changed to another scheme that has a higher transmission rate.

The above-described features enable the communication apparatus 1 to choose more appropriate modulation and coding schemes, considering the viewpoint of other communication apparatuses 2, 3, and 4 with which the communication apparatus 1 is to communicate. In other words, the communication apparatus 1 can select modulation and coding schemes that minimize the transmission rate per unit resource and total transmission power in uplink communication while ensuring allocation of resources that the communication apparatuses 2, 3, and 4 require. This feature alleviates the burden on the communication apparatuses 2, 3, and 4. Similarly, the communication apparatus 1 can select modulation and coding schemes for downlink communication which minimize the transmission rate per unit resource while ensuring allocation of resources necessary for data transmission to the communication apparatuses 2, 3, and 4. This feature increases the probability of successful reception of signals at the receiving communication apparatuses 2, 3, and 4.

The specifics of the present embodiment will now be described in detail below with reference to the accompanying drawings.

Figure 2:
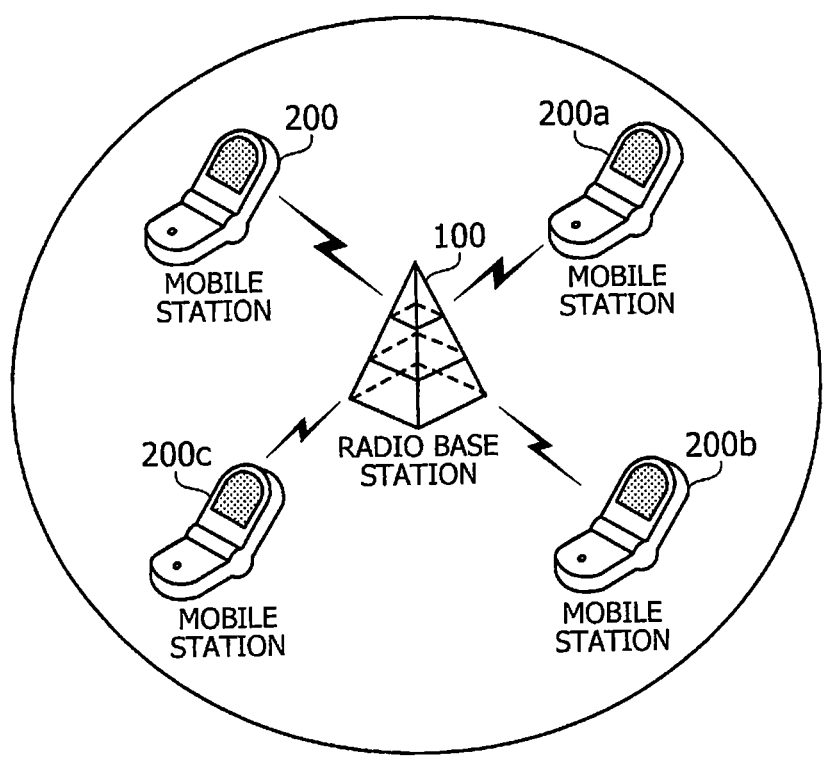
FIG. 2 illustrates a system configuration according to the present embodiment.

FIG. 2 illustrates a system configuration according to the present embodiment. This wireless communications system according to the present embodiment includes a radio base station 100 and mobile stations 200, 200a, 200b, and 200c. The mobile stations 200, 200a, 200b, and 200c are located in the radio coverage area (cell) of the radio base station 100. While not illustrated in FIG. 2, the radio base station 100 is connected to its upper-level stations and other radio base stations via wired or wireless links.

The radio base station 100 is a wireless communication device capable of communicating simultaneously with multiple mobile stations 200, 200a, 200b, and 200c via radio waves. More specifically, the radio base station 100 can receive user data and control information that the mobile stations 200, 200a, 200b, and 200c transmit by sharing a single radio frame. The radio base station 100 can also transmit user data and control information addressed to the mobile stations 200, 200a, 200b, and 200c by using a single radio frame.

The mobile station 200, 200a, 200b, and 200c are wireless communication devices (e.g., cellular phones) capable of communicating with the radio base station 100 via radio waves when they are in the cell of the radio base station 100. When they have user data or control data to transmit, the mobile stations 200, 200a, 200b, and 200c receive an allocation of radio resources from the radio base station 100 and transmit such data using the allocated radio resources. The mobile stations 200, 200a, 200b, and 200c also receive signals from the radio base station 100 and extract therefrom user data and control information when they find such data and information in the received signals.

The wireless communications system according to the present embodiment controls adaptive modulation and coding. More specifically, the radio base station 100 selects an appropriate modulation and coding scheme for each individual mobile station 200, 200a, 200b, and 200c, depending on the current condition of their communication links. Selection of modulation and coding schemes is made separately for uplink communication and downlink communication. It is noted that the present embodiment assumes conformity to the IEEE 802.16e standard in wireless communication between the radio base station 100 and mobile stations 200, 200*a*, 200*b*, and 200*c*.

Figure 3:
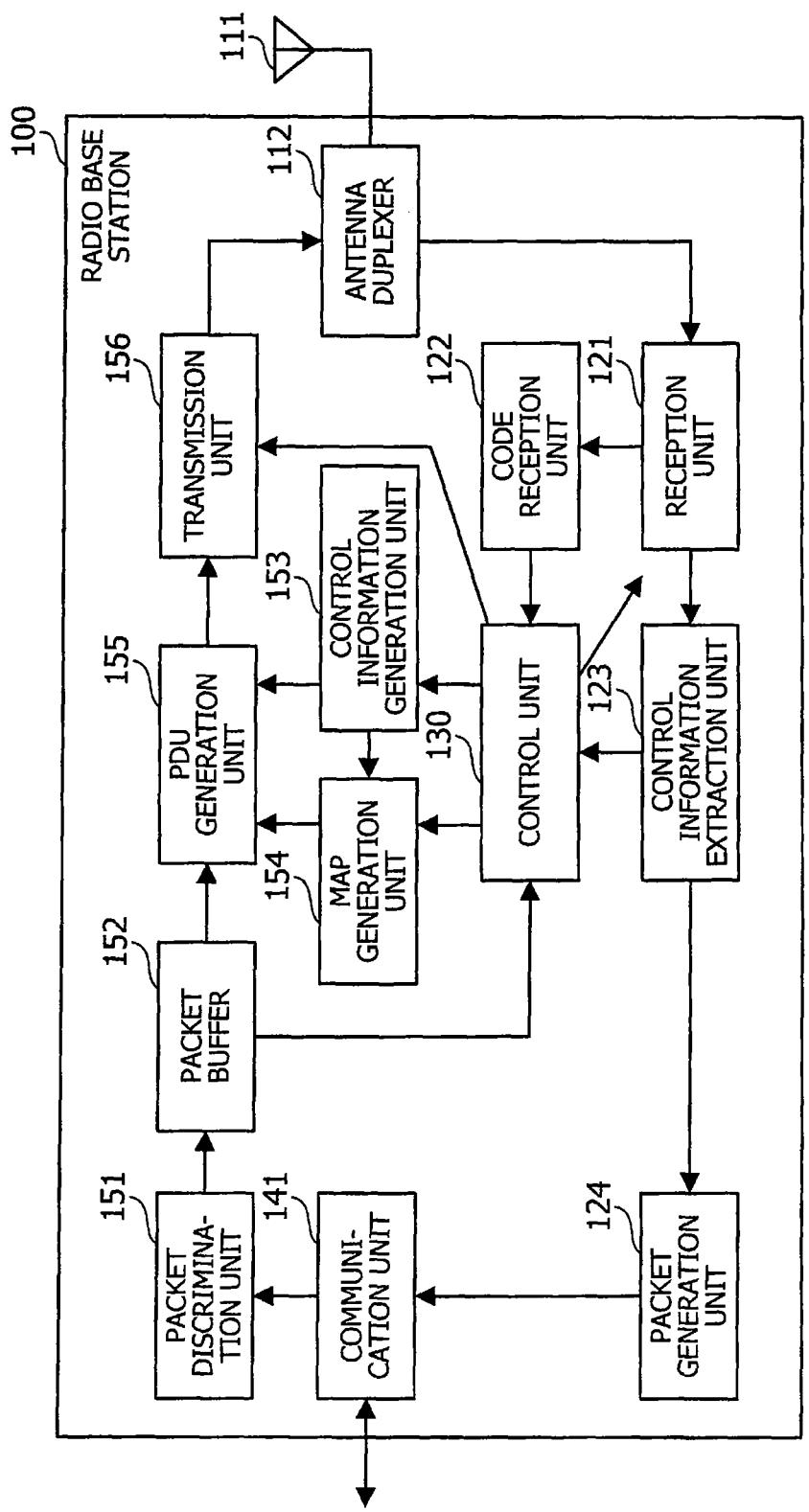
FIG. 3 is a functional block diagram of a radio base station.

FIG. 3 is a functional block diagram of a radio base station. This radio base station 100 includes a transmit-receive antenna 111, an antenna duplexer 112, a reception unit 121, a code reception unit 122, a control information extraction unit 123, a packet generation unit 124, a control unit 130, a communication unit 141, a packet discrimination unit 151, a packet buffer 152, a control information generation unit 153, a map generation unit 154, a PDU generation unit 155, and a transmission unit 156.

The transmit-receive antenna 111 is an antenna used for both transmission and reception of signals. Specifically, the transmit-receive antenna 111 radiates radio waves of transmit signals supplied from an antenna duplexer 112. The transmit-receive antenna 111 also receives radio wave signals and supplies them to the antenna duplexer 112.

The antenna duplexer 112 is a device that separates transmit signals and receive signals from each other, which may simply be called a duplexer. Specifically, the antenna duplexer 112 supplies transmission signals from the transmission unit 156 to the transmit-receive antenna 111, as well as routing receive signals from the transmit-receive antenna 111 to the reception unit 121. The antenna duplexer 112 filters receive signals, as well as preventing transmit signals from flowing into the receiver circuitry.

Out of the receive signals supplied from the antenna duplexer 112, the reception unit 121 extracts signals in Ranging region, a region of radio frames, and provides them to the code reception unit 122. The reception unit 121 also demodulates and decodes the received signals according to the demodulation method and decoding method specified by the control unit 130. The resulting data is supplied to the control information extraction unit 123.

The code reception unit 122 compares a signal received from the reception unit 121 with a plurality of ranging codes, thus determining which ranging code the received signal indicates. The code reception unit 122 also analyzes the received signal to measure the receive power level, uplink radio quality, receive timing offset, and the like. The code reception unit 122 then sends the result of its ranging code determination, together with those various measurements, to the control unit 130.

The control information extraction unit 123 extracts control information and user data out of the data supplied from the reception unit 121. The control information extraction unit 123 outputs the extracted user data to the packet generation unit 124, while supplying the extracted control data to the control unit 130. The extracted control information may include parameters indicating the current transmission power level of each mobile station 200, 200*a*, 200*b*, and 200*c*, the measurement result of downlink quality, and allocation requests for uplink radio resources.

The packet generation unit 124 produces a data packet by compiling user data received from the control information extraction unit 123. This data packet conforms to a prescribed format used to transport data between the radio base station 100 and its upper-level station or peer radio base stations. The packet generation unit 124 then sends the produced data packet to the communication unit 141.

The control unit 130 controls the overall operation of signal transmission and reception in the radio base station 100. For example, the control unit 130 controls allocation of uplink radio resources based on ranging code information provided from the code reception unit 122 and control information provided from the control information extraction unit 123.

The control unit 130 also controls allocation of downlink radio resources based on the current occupancy of the packet buffer 152 storing data packets. The control unit 130 then notifies the map generation unit 154 of the result of radio resource allocation.

The control unit 130 controls the process of adaptive modulation and coding individually for uplink communication and downlink communication, depending on the radio link quality and transmission power level of individual mobile stations 200, 200*a*, 200*b*, and 200*c*. The control unit 130 informs the reception unit 121, map generation unit 154, and transmission unit 156 of the determined modulation and coding schemes. Otherwise, the control unit 130 performs various control operations and, if necessary, commands the control information generation unit 153 to produce control information.

The communication unit 141 is a network interface that transmits and receives data packets to/from upper-level stations or other wireless communication devices. Specifically, the communication unit 141 receives data packets from the packet generation unit 124 and transmits them to the network. The communication unit 141 also receives data packets from the network and supplies them to the packet discrimination unit 151.

The packet discrimination unit 151 examines the header of data packets supplied from the communication unit 141, thereby identifying their destinations and data types. According to this identification result, the packet discrimination unit 151 stores the data packets in appropriate locations in the packet buffer 152.

The packet buffer 152 is a buffer memory for temporarily storing data packets received from upper-level stations and other radio base stations. Specifically, the packet buffer 152 provides a plurality of storage spaces to sort the data packets according to their destinations and data types. The packet buffer 152 outputs those data packets in response to access requests from the PDU generation unit 155.

The control information generation unit 153 produces control information for the mobile stations 200, 200*a*, 200*b*, and 200*c* in response to commands from the control unit 130. The produced control information may include, among other things, acknowledgment of received user data and control information, an update command for transmission power level and transmit timing, current transmission power levels, and a request for quality measurement results. Then the control information generation unit 153 supplies the produced control information to the PDU generation unit 155, as well as notifying the map generation unit 154 that the control information has been produced.

The map generation unit 154 produces DL-MAP data, based on information from the control unit 130 and control information generation unit 153. This DL-MAP data describes allocation of downlink radio resources. The map generation unit 154 also produces UL-MAP data, based on information from the control unit 130. This UL-MAP data describes allocation of uplink radio resource. The produced DL-MAP data and UL-MAP data are sent to the PDU generation unit 155.

The PDU generation unit 155 consults the DL-MAP data supplied from the map generation unit 154 so as to determine which data packet to transmit next, and then extracts the determined data packet from the packet buffer 152. The PDU generation unit 155 then produces data of a radio frame by using DL-MAP data and UL-MAP data supplied from the map generation unit 154 in addition to data packets supplied from the packet buffer 152. Radio frame is the protocol data unit (PDU) in the radio link section. The PDU generation unit 155 then sends the produced radio frame data to the transmission unit 156.

The transmission unit 156 encodes and modulates the radio frame data supplied from the PDU generation unit 155, according to the modulation method and coding method specified by the control unit 130. The transmission unit 156 then outputs the resulting transmit signals to the antenna duplexer 112.

Figure 4:
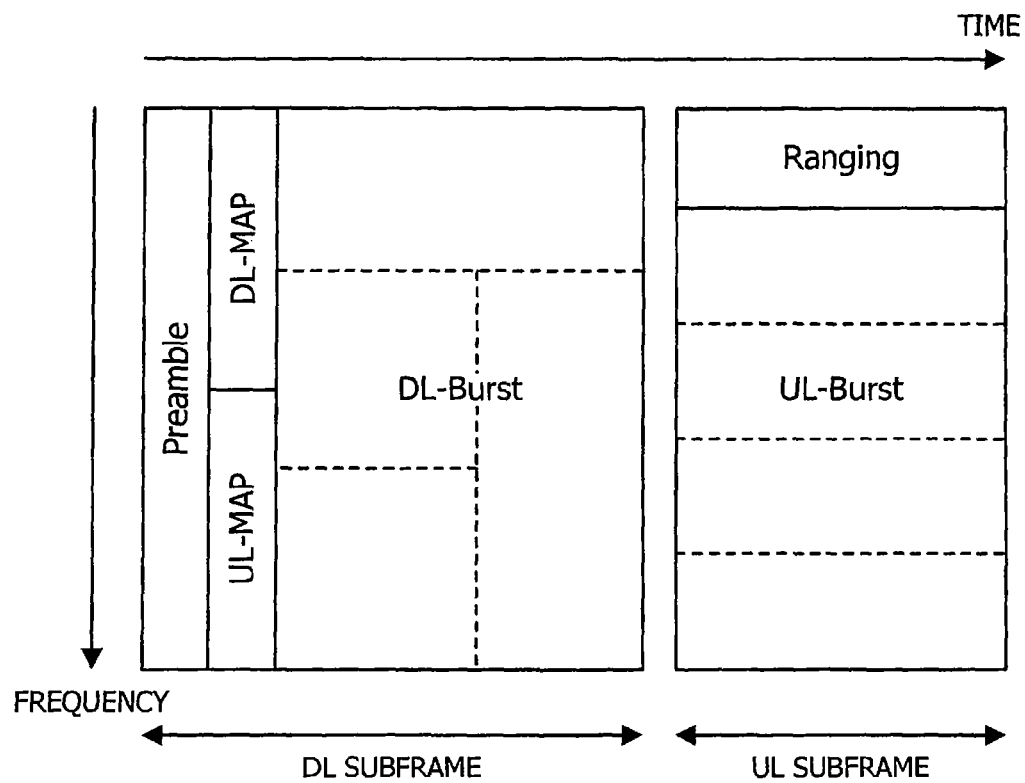
FIG. 4 illustrates a data structure of radio frames.

FIG. 4 illustrates a data structure of radio frames. This radio frame of FIG. 4 is used in wireless communication between the radio base station 100 and mobile stations 200, 200a, 200b, and 200c. According to the present embodiment, the proposed wireless communications system offers half-duplex communication using a time-division duplex (TDD) technique. More specifically, one radio frame is divided into two time periods. The first time period is used as a DL subframe for downlink communication, and the second time period is used as a UL subframe for uplink communication.

The DL subframe begins with a preamble region which acts as a delimiter between radio frames. This preamble region carries prescribed preamble signals. The preamble region is followed by DL-MAP region, which is used to transmit DL-MAP data. The DL-MAP area is then followed by DL-Burst region. A part of this DL-Burst region is dedicated as UL-MAP region to transmit UL-MAP data. The rest of the DL-Burst region is assigned for transmission of user data and control information to each mobile station. The current allocation of DL-Burst region is described in the DL-MAP data.

The UL subframe has a ranging region to transmit ranging codes. Mobile stations 200, 200a, 200b, and 200c are allowed to use the ranging region to transmit their ranging codes without asking permission of the radio base station 100. The rest of the UL subframe is assigned as UL-Burst region for the purpose of transmission of user data and control information from mobile stations 200, 200a, 200b, and 200c to their radio base station 100. The current allocation of UL-Burst region is described in the UL-MAP data.

The resources in a radio frame are managed in units of subchannels along the frequency axis, and in units of symbols along the time axis. The term "subchannel" refers to a prescribed number of subcarriers being bundled together. Allocation of such resources to mobile stations 200, 200a, 200b, and 200c is performed on an individual slot basis. Slot is a portion of the resources that has a frequency range of a single subchannel and a time period across a prescribed number of symbols (e.g., three symbols).

FIG. 5 illustrates a data structure of UL-MAP data. UL-MAP data is transmitted by using UL-MAP region in a DL subframe. Specifically, UL-MAP data includes the following data items: Connection Identifier (CID), Uplink Interval Usage Code (UIUC), Duration, and Repetition Coding Indication. UL-MAP region carries the values of these data items for each different mobile station 200, 200a, 200b, and 200c.

CID is a 16-bit identifier assigned to each mobile station connected to the radio base station 100. UIUC is a 4-bit identifier indicating which modulation and coding scheme the mobile station identified by CID is supposed to use in its uplink communication. Duration is a 10-bit numerical value indicating the radio resource (slot) assigned to the mobile station identified by CID. Repetition Coding Indication is a bit string used to control the operation of repetitively transmitting the same data (repetition coding). Repetition Coding Indication is two bits in length.

FIG. 6 illustrates a data structure of DL-MAP data. DL-MAP data is transmitted by using the DL-MAP region in a DL subframe. Specifically, DL-MAP data includes the following data items: CID, Downlink Interval Usage Code (DIUC), Symbol Offset, Subchannel Offset, Boosting, No. Symbols, No. Subchannels, and Repetition Coding Indication. DL-MAP region carries the values of these data items for each different mobile station 200, 200a, 200b, and 200c.

As already noted, CID is an identifier assigned to each mobile station connected to the radio base station 100. DL-MAP data may specify one or more CIDs. DIUC is a 4-bit identifier indicating which modulation and coding scheme the mobile station identified by CID is supposed to use in its downlink communication. Symbol Offset is a 6-bit numerical value pointing to the leading symbol of a region assigned to the mobile station identified by CID. Subchannel Offset is a 6-bit numerical value pointing to the topmost subchannel of a region allocated to the mobile station identified by CID. The combination of Symbol Offset and Subchannel Offset is used to identify the leading slot of an allocated region.

Boosting is a bit string used for boost control, i.e., the control operation of temporarily raising the transmission power level. Boosting is three bits in length. No. Symbols is a 7-bit numerical value representing the number of symbols allocated to the mobile station identified by CID. No. Subchannels is a 6-bit numerical value representing the number of subchannels allocated to the mobile station identified by CID. Repetition Coding Indication is, as already noted, a bit string used to control repetition processing.

Data transmission of DL-Burst and UL-Burst regions is performed with specific modulation and coding schemes. The definition of which modulation and coding scheme to use is called a "burst profile." Selecting a specific burst profile means determining a specific set of modulation method, coding method, and coding rate for data transmission. The radio base station 100 and mobile stations 200, 200a, 200b, and 200c share the information about candidates for burst profile before they start data transmission on DL-Burst region and UL-Burst region.

FIG. 7 illustrates a data structure of a profile candidate table. The profile candidate table 131 of FIG. 7 is stored in an appropriate memory under the management of the control unit 130. Specifically, the profile candidate table 131 is formed from the following data fields: UIUC/DIUC, Modulation and Coding Scheme, and SINR Threshold. The field values arranged in the horizontal direction are associated with each other, thus forming a single entry of burst profile.

The UIUC/DIUC field contains an identifier of a burst profile (modulation and coding scheme). This identifier corresponds to what have been described above as UIUC and DIUC. The modulation and coding scheme field contains a character string indicating a specific modulation method, coding method, and coding rate. The SINR threshold field contains a value of signal to interference and noise ratio (SINR) which represents the lower limit of radio communication quality required so as to apply the corresponding burst profile (modulation and coding scheme).

The choices for the modulation method include: quadrature phase shift keying (QPSK) and 16-level quadrature amplitude modulation (16QAM). The choices for the coding method include: convolutional code (CC), convolutional turbo code (CTC), and block turbo code (BTC). The choices for the coding rate include: 1/2 (ratio of 1:1 between information bits and check bits), 2/3 (ratio of 2:1 between information bits and check bits), and 3/4 (ratio of 3:1 between information bits and check bits). The transmission rate is a function of those choices of modulation method, coding method, and coding rate. The profile candidate table 131 arranges its entries in descending order of transmission rates and assigns their identifiers accordingly.

The profile candidate table 131 has been created by an administrator and registered in the radio base station 100. For example, the profile candidate table 131 has an entry with UIUC/DIUC=2, Modulation and Coding Scheme=QPSK (CC)2/3, and SINR Threshold=5 dB. This entry means that the radio communication quality has to be as good as SINR of 5 dB or more in order to transmit data with the modulation and coding scheme that uses QPSK modulation, CC coding, and 2/3 coding rate.

It is noted that the present embodiment uses the same set of burst profiles for both uplink communication and downlink communication. Therefore, UIUC and DIUC have substantially the same meaning. It is also possible, however, to provide separate sets of burst profiles for uplink communication and downlink communication. When this is the case, two tables similar to the above-described profile candidate table 131 are created, one for uplink communication and the other for downlink communication.

FIG. 8 illustrates a data structure of a mobile station data table. The mobile station data table 132 of FIG. 8 is stored in an appropriate memory under the management of the control unit 130. This mobile station data table 132 is formed from the following data fields: Mobile Station ID, Transmission Power, Maximum Transmission Power, and SINR. The field values arranged in the horizontal direction are associated with each other, thus forming a single entry describing a specific mobile station.

The mobile station ID field contains an identifier of a specific mobile station 200, 200a, 200b, and 200c. The foregoing CID may serve as this mobile station ID. The transmission power field contains a numerical value indicating the current transmission power level of each mobile station. More specifically, this value represents the transmission power per subchannel in the case where a modulation and coding scheme with the lowest transmission rate (e.g., QPSK(CC)1/2) is applied. The maximum transmission power field contains a numerical value indicating a transmission power level that can be achieved by increasing the output up to its maximum point. The SINR field indicates a downlink SINR value measured by the corresponding mobile station.

The control unit 130 updates the mobile station data table 132 as the need arises, based on control information that the mobile stations 200, 200a, 200b, and 200c transmit. For example, the mobile station data table 132 has an entry with Mobile Station ID=MS1, Transmission Power=2 dBm, Maximum Transmission Power=20 dBm, and SINR=15 dB. In the present context, mobile station IDs MS1, MS2, MS3, and MS4 correspond to mobile stations 200, 200a, 200b, and 200c, respectively.

FIG. 9 illustrates a data structure of a data traffic size table. The data traffic size table 133 of FIG. 9 is stored in an appropriate memory under the management of the control unit 130. Specifically, the data traffic size table 133 is formed from the following data fields: Mobile Station ID, UL Data, and DL Data. The field values arranged in the horizontal direction are associated with each other, thus forming a single entry describing a specific mobile station.

The mobile station ID field contains an identifier of a specific mobile station 200, 200a, 200b, and 200c. The UL data field indicates the amount of data, in units of bytes, which the corresponding mobile station is going to transmit in the next UL subframe. The DL data field indicates the amount of data, in units of bytes, which has to be transmitted to the corresponding mobile station in the next DL subframe.

The control unit 130 updates this data traffic size table 133 as the need arises. More specifically, the UL data field is updated based on control information received from the mobile stations 200, 200a, 200b, and 200c. The DL data field is updated based on the current occupancy of the packet buffer 152 storing data packets. For example, the data traffic size table 133 has an entry with Mobile Station ID=MS1, UL Data=192 bytes, and DL Data=384 bytes.

The next section will now describe the detailed processing in the wireless communications system with the above-described features and data structures. The description begins with a message flow between the radio base station 100 and mobile stations 200, 200a, 200b, and 200c and then proceeds to a more specific explanation of the adaptive modulation and coding control performed by the radio base station 100.

Figure 10:
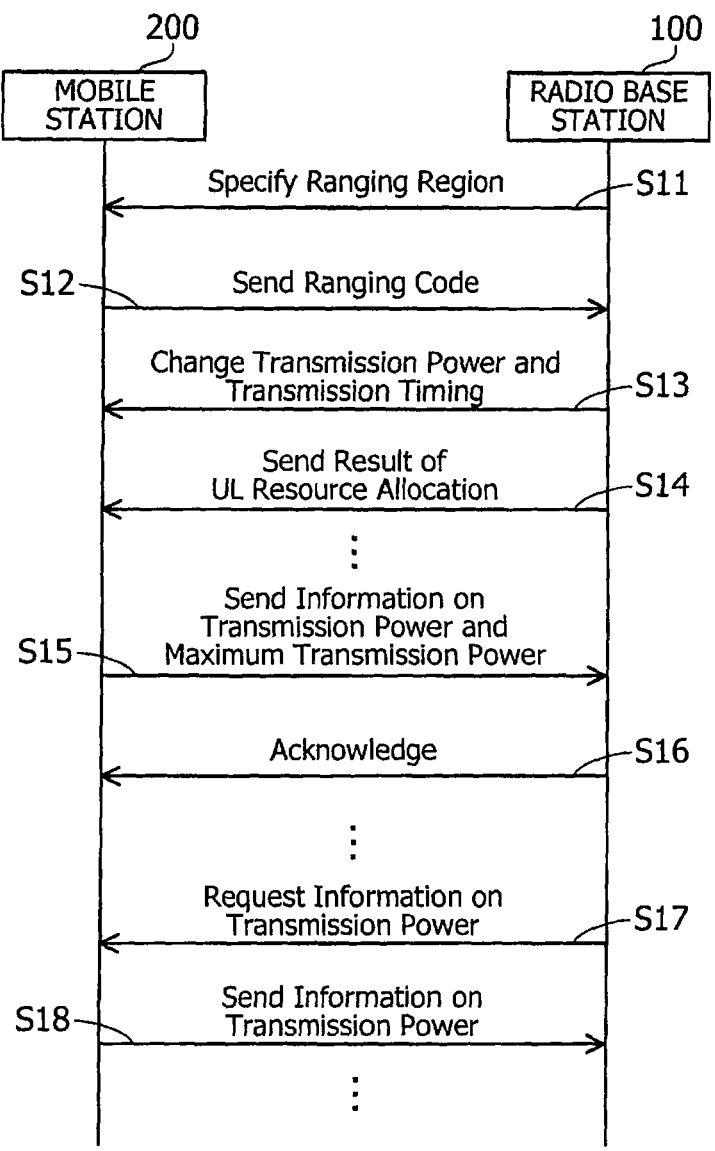
FIG. 10 is a sequence diagram illustrating an example process flow of transmission power control.

FIG. 10 is a sequence diagram illustrating an example process flow of transmission power control. The following will describe the illustrated process of FIG. 10 in the order of step numbers, assuming that a mobile station 200 is to make a first access to the radio base station 100.

[Step S11] The radio base station 100 continuously sends UL-MAP data, including location information of the ranging region, by using DL subframes. Note that the radio base station 100 is not aware of the mobile station 200 at this moment.

[Step S12] The mobile station 200 transmits a predetermined ranging code to initiate a connection, by using the ranging region specified by UL-MAP data. Here the mobile station 200 determines its initial transmission power level depending on the receive power level and quality of radio link signals received from the radio base station 100.

[Step S13] Based on the ranging code from the mobile station 200, the radio base station 100 measures the receive power level and receive timing (on both the frequency axis and time axis) and identifies their respective differences from the desired receive power level and receive timing. The radio base station 100 then sends an acknowledgment of the received ranging code back to the mobile station 200, including a command to change the transmission power level and transmit timing on the part of the mobile station 200.

Steps S12 and S13 are repeated until the mobile station 200 successfully finishes the adjustment of its transmission power level and transmit timing.

[Step S14] In order to execute an initial control procedure, including assignment of CID to the mobile station 200, the radio base station 100 allocates a UL-Burst region for the mobile station 200 to transmit control information. The radio base station 100 then transmits UL-MAP data indicating the allocation result.

It is noted here that the present explanation omits details of the initial control procedure, except for those related to transmission power control.

[Step S15] Using the UL-Burst region specified in the received UL-MAP data, the mobile station 200 transmits control information to the radio base station 100 so as to indicate its current transmission power level, as well as its maximum possible transmission power level.

[Step S16] Based on the control information from the mobile station 200, the radio base station 100 updates its mobile station data table 132 and sends acknowledgment of the received control information back to the mobile station 200.

[Step S17] The radio base station 100 may encounter the need for updated transmission power level information after the execution of step S16. If this is the case, the radio base station 100 sends some control information that requests the mobile station 200 to report its transmission power level. For example, the radio base station 100 may send such control information after a predetermined time since the previous update of the transmission power level information. Here the radio base station 100 allocates a UL-Burst region for use by the mobile station 200 to respond to the request, and transmits UL-MAP data indicating the location of the UL-Burst region.

[Step S18] In response to the request for information from the radio base station 100, the mobile station 200 transmits control information indicating its current transmission power level, using the UL-Burst region specified in the UL-MAP data.

The above steps permit the radio base station 100 to acquire information on the current transmission power level and maximum transmission power level of a mobile station 200 during their initial connection procedure. After that, the radio base station 100 collects the latest information about the transmission power level as occasion demands. Note that the maximum transmission power level will never change. Accordingly, there is no need to update the maximum transmission power level, once it is obtained at the time of initial connection.

Figure 11:
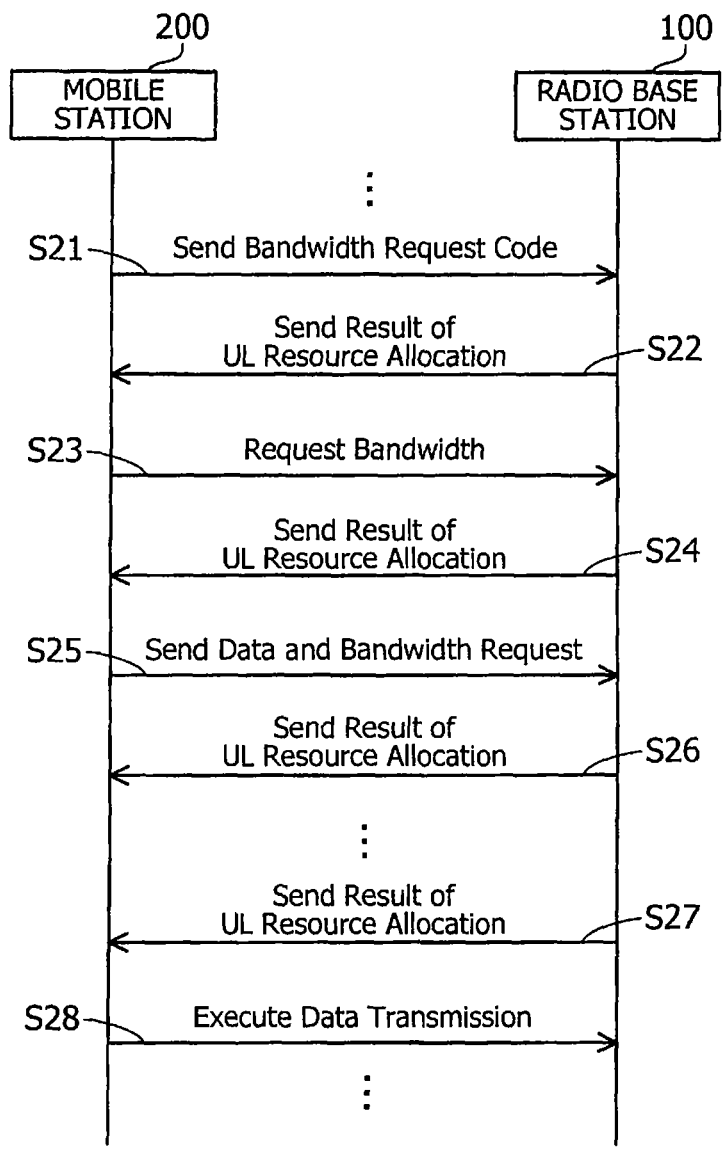
FIG. 11 is a sequence diagram illustrating an example process flow of bandwidth allocation control.

FIG. 11 is a sequence diagram illustrating an example process flow of bandwidth allocation control. The following will describe the illustrated process of FIG. 11 in the order of step numbers, assuming that a communication session is executed between the mobile station 200 and radio base station 100.

[Step S21] When it has transmit data (user data and control information) to send to the radio base station 100, the mobile station 200 first sends a bandwidth request ranging code (a ranging code to request a bandwidth) to the radio base station 100 by using a ranging region specified in the received UL-MAP data.

[Step S22] Upon detection of the bandwidth request ranging code from the mobile station 200, the radio base station 100 allocates a UL-Burst region for use by the mobile station 200 to request allocation and transmits UL-MAP data indicating the allocation result.

[Step S23] Using the UL-Burst region specified in the received UL-MAP data, the mobile station 200 transmits control information that indicates an allocation request, including information on the amount of data to be transmitted.

[Step S24] Based on the control information from the mobile station 200, the radio base station 100 updates its data traffic size table 133. The radio base station 100 then allocates a UL-Burst region for use in data transmission by the mobile station 200 and transmits UL-MAP data indicating the allocation result.

[Step S25] The mobile station 200 executes data transmission by using the allocated UL-Burst region specified in the UL-MAP data. Here the mobile station 200 may transmit some control information together with the transmit data, in the case where it has pending transmit data that has to be transmitted in the next and subsequent cycles. This control information, referred to as a piggyback request, requests allocation of resources for the next cycle.

[Step S26] The radio base station 100 receives payload data and control information from the mobile station 200. Based on the received control information, the radio base station 100 updates the data traffic size table 133. The radio base station 100 then allocates a UL-Burst region for use in data transmission by the mobile station 200 and transmits UL-MAP data indicating the allocation result.

Steps S25 and S26 are repeated until the mobile station 200 has no more pending transmit data.

[Step S27] Similarly to step S26, the radio base station 100 updates the data traffic size table 133 based on the received control information. The radio base station 100 then allocates a UL-Burst region for use in data transmission by the mobile station 200 and transmits UL-MAP data indicating the allocation result.

[Step S28] The mobile station 200 executes data transmission by using the allocated UL-Burst region specified in the UL-MAP data. When there is no more pending transmission data, the mobile station 200 stops transmitting piggyback requests, thus terminating the successive data transmission from the mobile station 200 to the radio base station 100.

According to the above steps, the mobile station 200 transmits a predetermined ranging code by using a ranging region, so as to notify the radio base station 100 that the mobile station 200 intends to initiate data transmission. The radio base station 100 first allocates a radio resource to the mobile station 200 for the purpose of its allocation request. When an allocation request indicating the amount of transmit data is received, the radio base station 100 allocates a corresponding amount of radio resources to the mobile station 200. The mobile station 200 thus transmits data by using the allocated radio resources. At the same time, the mobile station 200 may request another resource allocation for the next data transmission when it has more pending transmit data.

In the above-described embodiment, the mobile station 200 is configured to transmit a bandwidth request ranging code to the radio base station 100 to initiate data transmission. The embodiment may, however, be modified such that the radio base station 100 sends queries to the mobile station 200 at regular intervals to determine the presence of transmit data.

Figure 12:
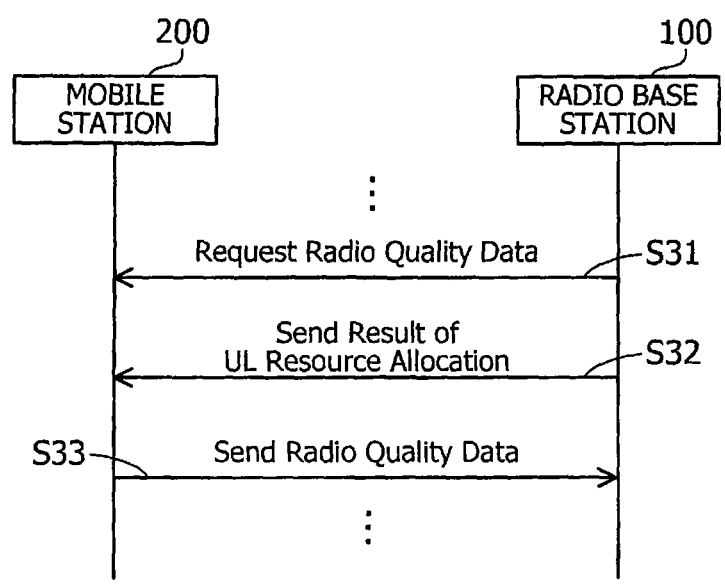
FIG. 12 is a sequence diagram illustrating an example process flow of DL radio quality measurement.

FIG. 12 is a sequence diagram illustrating an example process flow of DL radio quality measurement. The following section will describe the illustrated process of FIG. 12 in the order of step numbers, assuming that a communication session is executed between the mobile station 200 and radio base station 100.

[Step S31] The radio base station 100 may encounter the need for updated radio quality data of the mobile station 200. If this is the case, the radio base station 100 sends control information that requests the mobile station 200 to report its quality measurement result. For example, the radio base station 100 sends such control information after a predetermined time since the previous update to the radio quality data.

[Step S32] The radio base station 100 allocates a UL-Burst region for use by the mobile station 200 to transmit its quality measurement result and transmits UL-MAP data indicating the location of the UL-Burst region.

[Step S33] In response to the request for information from the radio base station 100, the mobile station 200 transmits control information including radio quality data such as SINR, using the UL-Burst region specified in the UL-MAP data.

According to the above steps, the radio base station 100 collects the latest radio quality data as necessary and updates its mobile station data table 132 with the collected data.

The next section will now describe the specifics of adaptive modulation and coding performed in the radio base station 100. The description will first present two control methods of adaptive modulation and coding for uplink communication, and then proceed to two control methods of adaptive modulation and coding for downlink communication.

Figure 13:
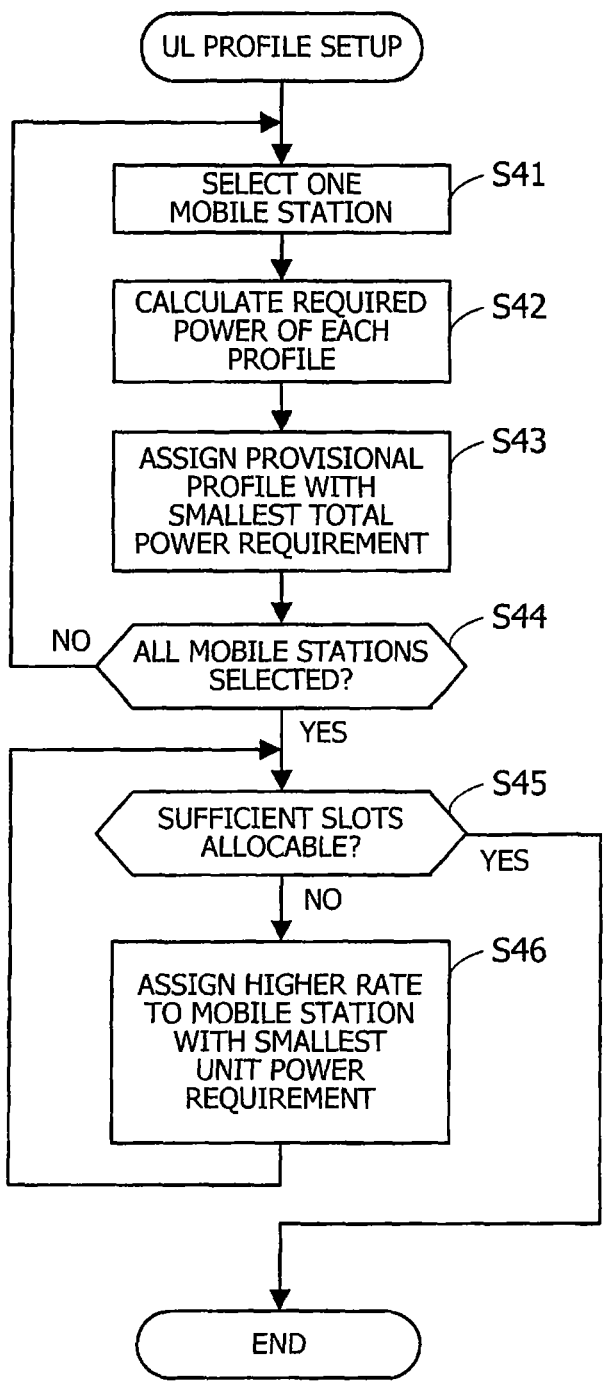
FIG. 13 is a flowchart illustrating a first UL profile setup process.

FIG. 13 is a flowchart illustrating a first UL profile setup process. The following will describe the illustrated process of FIG. 13 in the order of step numbers.

[Step S41] Consulting the data traffic size table 133, the control unit 130 selects one mobile station out of those scheduled to transmit data in the next radio frame.

[Step S42] With respect to the mobile station selected at step S41, the control unit 130 examines its transmission power level seen in the mobile station data table 132, as well as its amount of transmit data seen in the data traffic size table 133. Based on these pieces of information, the control unit 130 estimates a total power requirement for each different burst profile defined in the profile candidate table 131, assuming that those profiles are applied one by one to the selected mobile station.

[Step S43] The control unit 130 evaluates the estimates of total power requirement that have been obtained at step S42 and chooses a burst profile with the smallest estimate as a provisional burst profile for the mobile station selected at step S41. Also the control unit 130 calculates the number of slots required in the case where the provisional burst profile is used.

[Step S44] The control unit 130 determines whether it has selected at step S41 all the mobile stations scheduled to transmit data. If so, the process advances to step S45. If there are still pending mobile stations, the process proceeds to step S41.

[Step S45] Assuming the use of the provisional burst profile, the control unit 130 determines whether it is possible to allocate all the required slots in the UL-Burst region of the next radio frame. If it is found possible to allocate those resources, the control unit 130 chooses the provisional burst profiles as the final choice, thus terminating the present profile setup process. If it is found impossible to allocate all necessary resources, the process advances to step S46.

[Step S46] The control unit 130 chooses a mobile station with the smallest unit power requirement, from among the mobile stations scheduled to transmit data in the next radio frame. Then the control unit 130 chooses another burst profile one grade above the provisional burst profile of the selected mobile station in terms of transmission rates, and calculates again the number of required slots. The process then proceeds to step S45.

According to the above steps, the radio base station 100 makes a provisional selection of a burst profile for each mobile station having data to transmit, the provisional burst profile supposedly minimizing the total power requirement during data transmission. The radio base station 100 then determines whether it can allocate radio resources for those provisional burst profiles. If it is not possible to allocate sufficient resources, the burst profile of a mobile station having a smaller unit power requirement is replaced with another burst profile whose transmission rate is one grade higher than the current rate. This replacement of burst profiles reduces the consumption of radio resources. The allocability of radio resources is then determined again, and if the result is positive, the provisional burst profiles are determined to be the final choice.

The above-described features make it possible to reduce the power consumption of the mobile stations 200, 200a, 200b, and 200c as much as possible, while ensuring that all radio resources can be allocated as needed.

FIG. 14 illustrates a data structure of a power requirement table. This power requirement table is created for each individual mobile station when the control unit 130 sets up a UL profile. The power requirement table 134 illustrated in FIG. 14 is for the mobile station 200. The power requirement table 134 is formed from the following data fields: Profile, Subchannels, Unit Power Requirement, and Total Power Requirement. The field values arranged in the horizontal direction are associated with each other.

The profile field contains a character string indicating a modulation and coding scheme which may be used in a burst profile. Modulation and coding schemes, each represented as a specific combination of modulation method, coding method, and coding rate, are registered in the profile candidate table 131.

The subchannels field indicates the number of subchannels used at least in data transmission. This number of subchannels can be calculated from the amount of data that the mobile station 200 is going to transmit and the number of bits that can be conveyed by a slot. The latter parameter may vary depending on which modulation and coding scheme is used.

The unit power requirement field contains a value of required power per subchannel. Specifically, the burst profile QPSK(CC)1/2 has the lowest transmission rate of all profiles in the table. The power requirement of this QPSK(CC)1/2 is equal to the transmission power level that the mobile station 200 has reported. For the other burst profiles, their required power values are obtained by adding some appropriate increments to the transmission power level reported by the mobile station 200. Take the burst profile QPSK(CC)2/3 with the second to the lowest transmission rate, for example. The required power of this burst profile is calculated by adding 1.5 dBm to the required power of the burst profile with the lowest transmission rate.

The control unit 130 has knowledge about how the required power levels differ from burst profile to burst profile. Specifically, the unit power requirement varies in proportion to the transmission rate. That is, the higher the transmission rate, the larger the unit power requirement.

The total power requirement field contains a value of total required power, which is calculated from the number of subchannels and the unit power requirement. More specifically, the total power requirement is calculated by converting the given dBm value (logarithmic value) of unit power requirement into a true value (non-logarithmic value), multiplying it by the number of subchannels, and reconverting the product back to a dBm value (logarithmic value). It is noted here that while the total power requirement generally tends to be proportional to the transmission rate, their proportional relationship may not exactly be true when the number of subchannels is taken into consideration. In other words, the use of a burst profile having the lowest transmission rate does not always minimize the total power requirement.

The power requirement table 134 is compiled from data obtained at step S42 of the foregoing UL profile setup process. For example, the control unit 130 adds an entry that indicates: Profile=QPSK(CC)1/2, Subchannels=8, Unit Power Requirement=2 dBm, and Total Power Requirement=11 dBm.

FIG. 15 illustrates a data structure of a UL profile setup table. The UL profile setup table 135 of FIG. 15 is created by the control unit 130 when it executes a UL profile setup process. This UL profile setup table 135 is formed from the following data fields: Mobile Station ID, Profile, Unit Power Requirement, and Slot Allocation. The field values arranged in the horizontal direction are associated with each other, thus forming a single entry describing a specific mobile station.

The mobile station ID field contains an identifier of a specific mobile station 200, 200a, 200b, and 200c. The profile field contains a character string indicating a modulation and coding scheme which may be used in a burst profile. The unit power requirement field contains a value of required power per subchannel in the case where the modulation and coding scheme specified in the profile field is at work. This value corresponds to one of those registered in the unit power requirement field of the power requirement table 134. The slot allocation field indicates the number of slots that are necessary for data transmission in the case where the modulation and coding scheme specified in the profile field is at work.

The UL profile setup table 135 is compiled from data obtained at steps S43 and S46 of the foregoing UL profile setup process. For example, the control unit 130 adds an entry that indicates: Mobile Station ID=MS1, Profile=QPSK(CC) 1/2, Unit Power Requirement=2 dBm, and Slot Allocation=32.

FIG. 16 schematically illustrates a flow of a first UL profile setup process. Specifically, FIG. 16 illustrates UL profile setup tables 135a, 135b, and 135c as an example of how the UL profile setup table 135 is changed during the UL profile setup process of FIG. 13.

As can be seen from the UL profile setup table 135a, each mobile station 200, 200a, 200b, and 200c is provisionally assigned a burst profile that minimize their total power requirement. Specifically, the mobile stations 200, 200b, and 200c are assigned a burst profile using a modulation and coding scheme of QPSK(CC)1/2, whereas the mobile station 200a is assigned a burst profile using a modulation and coding scheme of QPSK(CC)2/3.

Suppose now that the total number of slot allocations in the UL profile setup table 135a exceeds the number of slots allocable in the UL-Burst region. This causes a change to the burst profile of a mobile station having the smallest unit power requirement, as seen in the next UL profile setup table 135b. Specifically, the burst profile of the mobile station 200 is changed from the one with a unit power requirement of 2 dBm to QPSK(CC)2/3, whose transmission rate is one grade higher than the original rate. This change in the profile field also affects the unit power requirement field and the slot allocation field.

Even with the UL profile setup table 135a, however, the total number of slot allocations may still exceed the number of slots allocable in the UL-Burst region. If this is the case, an additional change is made to the burst profile of a mobile station having the smallest unit power requirement, as seen in the next UL profile setup table 135c. Specifically, the burst profile of another mobile station 200c is changed from the one with a unit power requirement of 3 dBm to QPSK(CC)2/3, whose transmission rate is one grade higher than the original rate. This change in the profile field also affects the unit power requirement field and the slot allocation field.

As can be seen from the above example, each mobile station is first assigned a provisional burst profile with a minimum total power requirement. If it is not possible to allocate sufficient radio resources, then the transmission rate is raised by one grade for the mobile station having the smallest unit power requirement at that moment. This is repeated until all the necessary radio resources are found allocable. The result is minimized power consumption in each mobile station. It is noted that the above-described operation of raising transmission rates is applied to a different mobile station each time, because the unit power requirement is increased by a raised transmission rate.

Figure 17:
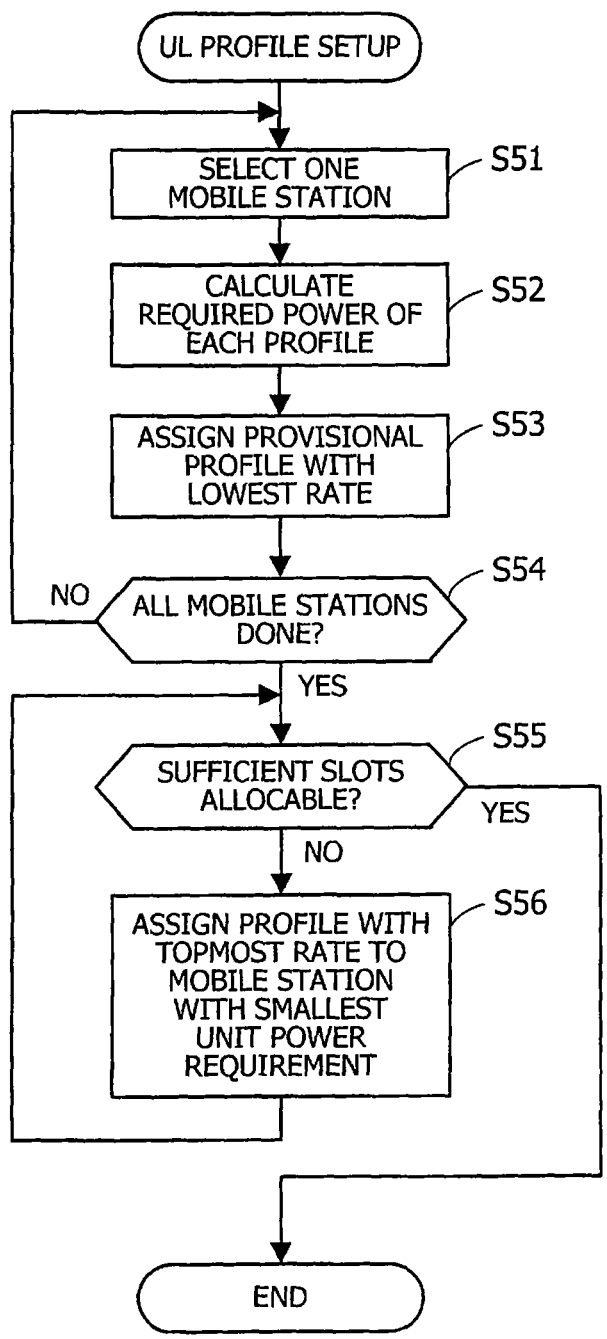
FIG. 17 is a flowchart of a second UL profile setup process.

FIG. 17 is a flowchart of a second UL profile setup process. The following will describe the illustrated process of FIG. 17 in the order of step numbers.

[Step S51] Consulting the data traffic size table 133, the control unit 130 selects one mobile station out of those scheduled to transmit data in the next radio frame.

[Step S52] With respect to the mobile station selected at step S51, the control unit 130 examines its transmission power level seen in the mobile station data table 132. Based on this information, the control unit 130 estimates a unit power requirement for each different burst profile defined in the profile candidate table 131, assuming that those profiles are applied one by one to the selected mobile station. That is, the control unit 130 creates a table similar to the foregoing power requirement table 134. It is, however, not necessary to calculate total power requirement.

[Step S53] Of all burst profiles defined in the profile candidate table 131, the control unit 130 makes a provisional selection of a burst profile with the lowest transmission rate and assigns it to the mobile station selected at step S51. Also the control unit 130 calculates the number of required slots in the case where the provisional burst profile is used. That is, the control unit 130 creates and updates the foregoing UL profile setup table 135.

[Step S54] The control unit 130 determines whether it has selected at step S51 all the mobile stations scheduled to transmit data. If so, the process advances to step S55. If there are pending mobile stations, the process proceeds to step S51.

[Step S55] Assuming the use of the assigned provisional burst profiles, the control unit 130 determines whether it is possible to allocate all the necessary slots in the UL-Burst region of the next radio frame. If it is found possible to allocate them, the control unit 130 chooses the provisional burst profiles as the final choice, thus terminating the present profile setup process. If it is found impossible to allocate sufficient slots, the process advances to step S56.

[Step S56] The control unit 130 chooses a mobile station with the smallest unit power requirement, from among the mobile stations scheduled to transmit data in the next radio frame. Then the control unit 130 replaces the provisional burst profile with an upper-bound burst profile applicable to the selected mobile station, and it calculates again the number of necessary slots, assuming the new burst profile. The process then returns to step S55. Here the term "upper-bound burst profile" refers to a burst profile having the highest transmission rate, of all the burst profiles whose unit power requirement does not exceed the maximum transmission power seen in the mobile station data table 132.

According to the above steps, the mobile stations having data to transmit are first assigned a provisional burst profile with the lowest transmission rate. It is then determined whether radio resources are allocable for those provisional burst profiles. If it is not possible to allocate sufficient resources, the burst profile of a mobile station with a smaller unit power requirement is replaced with another burst profile having the highest applicable transmission rate. This replacement of burst profiles alleviates the radio resource requirements. The allocability of radio resources is then determined again, and if the result is positive, the provisional burst profiles are determined to be the final choice.

It is therefore possible to control the power consumption of mobile stations 200, 200a, 200b, and 200c while ensuing that all resources can be allocated as needed. At the preceding step (first step), the base station provisionally selects a burst profile with the lowest transmission rate under the assumption that such a bust profile would minimize the total power requirement. This method accelerates the processing since it does not actually calculate total power requirement. At the succeeding step (second step), the transmission rate is raised, not stepwise, but right up to the upper bound, thus finishing the operation more quickly.

FIG. 18 schematically illustrates a flow of the second UL profile setup process. Specifically, FIG. 18 illustrates UL profile setup tables 135d, 135e, and 135f as an example of how the UL profile setup table 135 is changed during the UL profile setup process discussed in FIG. 17.

As can be seen from the UL profile setup table 135d, each mobile station 200, 200a, 200b, and 200c is provisionally assigned a burst profile with the lowest transmission rate. Specifically, the mobile stations 200, 200a, 200b, and 200c are each assigned a modulation and coding scheme of QPSK (CC)1/2 as their provisional burst profile.

Suppose now that the total number of slot allocations in the UL profile setup table 135d exceeds the number of slots allocable in the UL-Burst region. This causes a change to the burst profile of a mobile station having the smallest unit power requirement, as seen in the next UL profile setup table 135e. Specifically, the burst profile of the mobile station 200 is changed from the one with a unit power requirement of 2 dBm to another profile 16QAM(CC)3/4, whose transmission rate is the highest of all applicable burst profiles within the limit of maximum transmission power (20 dBm). This change in the profile field also affects the unit power requirement field and the slot allocation field.

Even with the UL profile setup table 135e, however, the total number of slot allocations may still exceed the number of slots allocable in the UL-Burst region. If this is the case, an additional change is made to the burst profile of a mobile station having the smallest unit power requirement, as seen in the next UL profile setup table 135f. Specifically, the burst profile of the mobile station 200a is changed from the original one with a unit power requirement of 3 dBm to another profile QPSK(CC)3/4, whose transmission rate is the highest of all applicable burst profiles within the limit of maximum transmission power (8 dBm). This change in the profile field also affects the unit power requirement field and the slot allocation field.

As can be seen from the above example, each mobile station is first assigned a provisional burst profile with the lowest transmission rate. If it is not possible to allocate sufficient radio resources, then the base station identifies a mobile station having the smallest unit power requirement at the moment, and raises its transmission rate to the upper bound. This operation is repeated until all necessary radio resources are found allocable, thereby controlling the power consumption in each mobile station.

According to another example of the UL profile setup process, the first half of the first method illustrated in FIG. 13 may be swapped with that of the second method illustrated in FIG. 17. That is, burst profiles that minimize the total power requirement of mobile stations are selected provisionally, and their transmission rates are then changed right up to the upper bound as necessary. It may also be possible to select provisional burst profiles with the lowest transmission rate, and then increase the transmission rates in a stepwise fashion. As can be seen from those examples, the selection of a processing method in the first half can be made independently of that in the second half.

Figure 19:
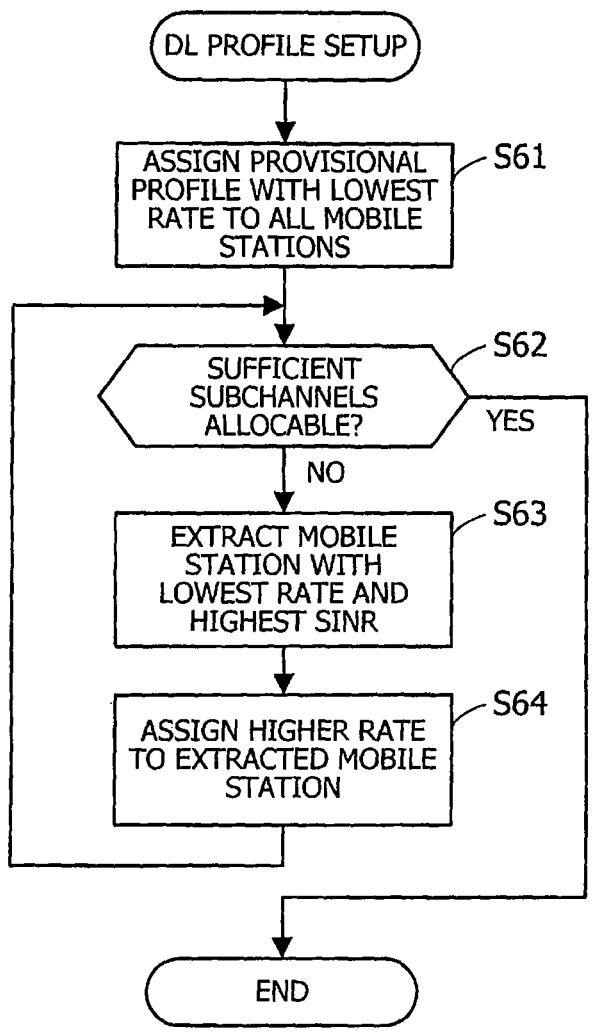
FIG. 19 is a flowchart of a first DL profile setup process.

FIG. 19 is a flowchart of a first DL profile setup process. The following will describe the illustrated process of FIG. 19 in the order of step numbers.

[Step S61] Consulting the data traffic size table 133, the control unit 130 identifies mobile stations to which data will be transmitted in the next radio frame. The control unit 130 then makes a provisional selection of a burst profile for each identified mobile station, by choosing the one with the lowest transmission rate from among those defined in the profile candidate table 131. Also the control unit 130 calculates the number of required subchannels, assuming the use of those provisional burst profiles.

[Step S62] The control unit 130 determines whether it is possible to allocate all necessary subchannels in the DL-Burst region of the next radio frame. If it is found possible to allocate all necessary subchannels, the control unit 130 chooses the provisional burst profiles as the final choice, thus exiting from the present profile setup process. If it is found impossible to allocate sufficient subchannels, the process advances to step S63.

[Step S63] The control unit 130 extracts mobile stations having the lowest transmission rate in their provisional burst profiles. In the case where two or more such mobile stations are found, the control unit 130 then extracts one of those mobile stations that has the highest SINR, by consulting the mobile station data table 132.

[Step S64] With respect to the mobile station extracted at step S63, the control unit 130 changes its provisional burst profile to another burst profile whose transmission rate is one grade higher than the current rate. The process then returns to step S62.

According to the above steps, the radio base station 100 assigns a provisional burst profile with the lowest transmission rate to each destination mobile station to which the radio base station 100 transmits data. The radio base station 100 then determines whether radio resources are allocable for those provisional burst profiles. If it is not possible to allocate sufficient resources, the provisional burst profile of a mobile station having a higher SINR (i.e., higher radio link quality) is replaced with another burst profile whose transmission rate is one grade higher than the current rate. This replacement of burst profiles alleviates the radio resource requirements. The allocability of radio resources is then determined again, and if the result is positive, the provisional burst profiles are determined to be the final choice.

The above-described features make it possible to reduce the transmission rates per unit resource as much as possible, while ensuring that sufficient radio resources can be allocated for complete transmission of data to the mobile stations 200, 200a, 200b, and 200c.

FIG. 20 illustrates a data structure of a DL profile setup table. The DL profile setup table 136 of FIG. 20 is created by the control unit 130 when it executes a DL profile setup process. Specifically, the DL profile setup table 136 is formed from the following data fields: Profile, Mobile Station ID, Total Data Size, and Subchannels. The field values arranged in the horizontal direction are associated with each other.

The profile field contains a character string indicating a modulation and coding scheme which may be used in a burst profile. This modulation and coding scheme is among those listed in the profile candidate table 131. The mobile station ID field contains identifiers of specific mobile stations to which the modulation and coding scheme in the profile filed is to be applied. The total data size field contains a value indicating the total amount of transmit data destined for the mobile stations seen in the mobile station ID field. The subchannels field indicates the number of subchannels necessary for transmission of as much data as specified in the total data size field. This number of subchannels is calculated from the amount of transmit data and the number of bits that can be conveyed by a single subchannel, where the latter parameter depends on which modulation and coding scheme is used.

The DL profile setup table 136 is compiled from data obtained at steps S61 and S64 in the foregoing DL profile setup process. For example, the control unit 130 adds an entry that indicates: Profile=QPSK(CC)1/2, Mobile Station ID=(MS1, MS2, MS3, MS4), Total Data Size=928 bytes, and Subchannels=11. It is noted that the DL profile setup table 136 has a different data structure from the foregoing UL profile setup table 135. This is because the DL-Burst region carries transmit data by combining multiple data using the same modulation and coding scheme into a single block.

Figure 21:
FIG. 21 schematically illustrates a flow of the first DL profile setup process.

FIG. 21 schematically illustrates a flow of the first DL profile setup process. Specifically, FIG. 21 illustrates DL profile setup tables 136a and 136b as an example of how the DL profile setup table 136 is changed during the DL profile setup process discussed in FIG. 19.

As can be seen from the DL profile setup table 136a, each mobile station 200, 200a, 200b, and 200c is provisionally assigned a burst profile with a minimum transmission rate. Specifically, the mobile stations 200, 200a, 200b, and 200c are assigned a modulation and coding scheme of QPSK(CC) 1/2 as their provisional burst profiles.

Suppose now that the total number of subchannels in the DL profile setup table 136a exceeds the number of subchannels allocable in the DL-Burst region. This causes a change to the burst profile of a mobile station having the highest SINR of those having the lowest transmission rate, as seen in the next DL profile setup table 136b. Specifically, the mobile station 200 has an SINR of 15 dB, which is the highest of all the mobile stations 200, 200a, 200b, and 200c. Accordingly, the burst profile of this mobile station 200 is changed to QPSK(CC)2/3, whose transmission rate is one grade higher than the original rate. This change also affects the total data size and required subchannels of each relevant burst profile.

As can be seen from the above example, each mobile station is first assigned a provisional burst profile with the lowest transmission rate. If it is not possible to allocate sufficient radio resources, then the transmission rate is raised by one grade for the mobile station having the lowest transmission rate and highest SINR at that moment. This operation is repeated until all the radio resources are found allocable. These features make it possible to transmit data addressed to destination mobile stations at as low transmission rate per unit resource as possible, thus increasing the probability of successful data reception at the destination mobile stations.

Figure 22:
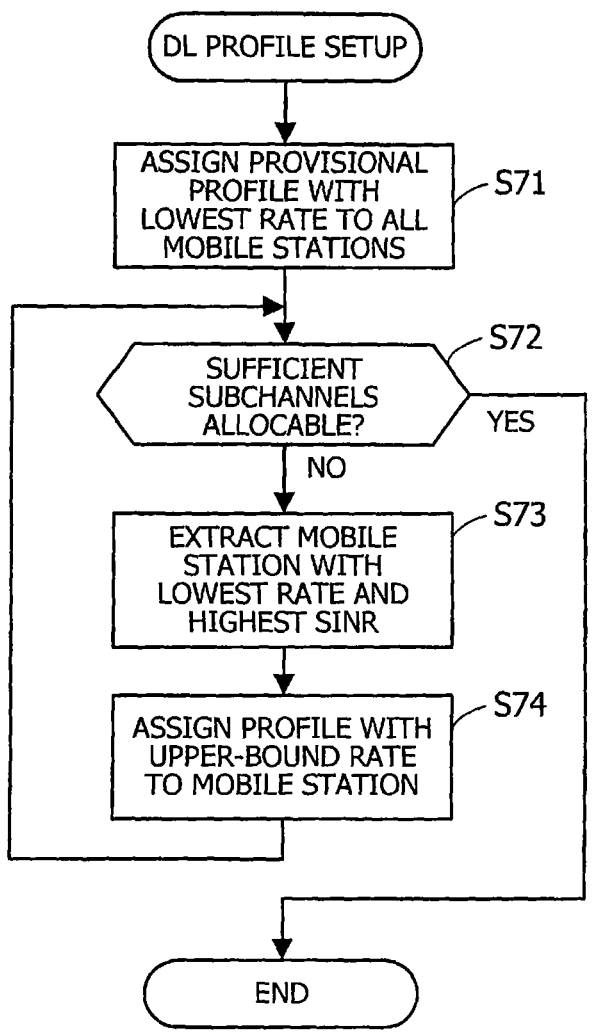
FIG. 22 is a flowchart of a second DL profile setup process.

FIG. 22 is a flowchart of a second DL profile setup process. The following will describe the illustrated process of FIG. 22 in the order of step numbers.

[Step S71] Consulting the data traffic size table 133, the control unit 130 identifies mobile stations to which data will be transmitted in the next radio frame. The control unit 130 then makes a provisional selection of a burst profile for each identified mobile station, by choosing the one with the lowest transmission rate from among those defined in the profile candidate table 131. Also the control unit 130 calculates the number of required subchannels, assuming the use of those provisional burst profiles.

[Step S72] The control unit 130 determines whether it is possible to allocate all necessary subchannels in the DL-Burst region of the next radio frame. If it is found possible to allocate all necessary subchannels, the control unit 130 chooses the provisional burst profiles as the final choice, thus terminating the present profile setup process. If it is found impossible to allocate sufficient subchannels, the process advances to step S73.

[Step S73] The control unit 130 extracts mobile stations having the lowest transmission rate in their provisional burst profiles. In the case where two or more such mobile stations are found, the control unit 130 then extracts one of those mobile stations that has the highest SINR, by consulting the mobile station data table 132.

[Step S74] With respect to the mobile station extracted at step S73, the control unit 130 changes its provisional burst profile to an upper-bound burst profile that is applicable to that mobile station. The process then returns to step S72. The term "upper-bound burst profile" refers herein to a burst profile whose transmission rate is the highest of all burst profiles whose SINR seen in the mobile station data table 132 satisfies the conditions of SINR Threshold described in the profile candidate table 131.

According to the above steps, the radio base station 100 first assigns a provisional burst profile with the lowest transmission rate to each destination mobile station to which the radio base station 100 transmits data. The radio base station 100 then determines whether radio resources are allocable for those provisional burst profiles. If it is not possible to allocate sufficient resources, the radio base station 100 identifies a mobile station having a low transmission rate in its provisional burst profile and indicating a high SINR (i.e., high radio link quality). The burst profile of this mobile station is then replaced with another burst profile having the highest applicable transmission rate. This replacement of burst profiles alleviates the radio resource requirements. The allocability of radio resources is then determined again, and if the result is positive, the radio base station 100 determines the provisional burst profiles as the final choice.

The above-described features make it possible to reduce the transmission rates per unit resource as much as possible, while ensuring that sufficient radio resources can be allocated for complete transmission of data to the mobile stations 200, 200a, 200b, and 200c. When necessary, the transmission rate is raised, not stepwise, but right up to the upper bound, thus finishing the operation more quickly.

Figure 23:
FIG. 23 schematically illustrates a flow of the second DL profile setup process.

FIG. 23 schematically illustrates a flow of the second DL profile setup process. Specifically, FIG. 23 illustrates DL profile setup tables 136c and 136d as an example of how the DL profile setup table 136 is changed during the DL profile setup process discussed in FIG. 22.

As can be seen from the DL profile setup table 136c, each mobile station 200, 200a, 200b, and 200c is provisionally assigned a burst profile with a minimum transmission rate. Specifically, the mobile stations 200, 200a, 200b, and 200c are assigned a modulation and coding scheme of QPSK(CC) 1/2 as their provisional burst profiles.

Suppose now that the total number of subchannels in the DL profile setup table 136c exceeds the number of subchannels allocable in the DL-Burst region. This causes a change to the burst profile of a mobile station having the highest SINR of those having the lowest transmission rate, as seen in the next DL profile setup table 136d. Specifically, the mobile station 200 has an SINR of 15 dB, which is the highest of all the mobile stations 200, 200a, 200b, and 200c. The burst profile of this mobile station 200 is thus changed to 16QAM (CC)3/4 which offers the highest transmission rate while satisfying the conditions of SINR threshold. This change also affects the total data size and required subchannels of each relevant burst profile.

As can be seen from the above example, each mobile station is first assigned a provisional burst profile with the lowest transmission rate. If it is not possible to allocate sufficient radio resources, then the transmission rate is raised to the upper bound for the mobile station having the lowest transmission rate and highest SINR at that moment. This operation is repeated until all necessary radio resources are found allocable. These features make it possible to transmit data addressed to destination mobile stations at as low transmission rate as possible, thus increasing the probability of successful data reception at the destination mobile stations.

The above-described features of the proposed wireless communications system enable the radio base station 100 to select more appropriate modulation and coding schemes, considering the viewpoint of mobile stations 200, 200a, 200b, and 200c that the radio base station 100 is serving.

In uplink communication, the system controls the total transmission power of each mobile station 200, 200a, 200b, and 200c, while ensuring the allocation of sufficient radio resources for complete reception of their transmit data. This also means reduction of power consumption in those mobile stations 200, 200a, 200b, and 200c.

In downlink communication, the system controls itself to lower the transmission rates as much as possible, while ensuring the allocation of sufficient radio resources for complete transmission of data to mobile stations 200, 200a, 200b, and 200c. This increases the probability of successful reception of signals at the mobile stations 200, 200a, 200b, and 200c, thus contributing to more stable operation of wireless communication.

The foregoing embodiments have been discussed using an example of a mobile communications system formed from a radio base station and mobile stations. The proposed control methods of adaptive modulation and coding can easily be applied to other kinds of communications systems such as a wireless communications system. The foregoing embodiments also assume IEEE 802.16e as the underlying communication standard. The proposed control methods of adaptive modulation and coding, however, can also be implemented with other standard specifications, particularly with those other than the TDD technique.

Further, the control methods of the above embodiments are not limited by the foregoing specific modulation and coding schemes. More particularly, the burst profiles may incorporate only one or two of modulation method, coding method, and coding rate as variable elements, while using the rest as fixed elements. The above embodiments also assume that different modulation and coding schemes may be selected for uplink communication and downlink communication. The embodiments may, however, be configured to use the same modulation and coding scheme for both uplink communication and downlink communication. The above embodiments may also be modified such that mobile stations will report their transmission power levels to the radio base station on a per-subcarrier basis, instead of on a per-subchannel basis.

The above-noted receiving apparatus, transmitting apparatus, reception method, and transmission method make it possible to select appropriate modulation and coding schemes, considering also the viewpoint of remote communication devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A receiving apparatus that specifies modulation and coding schemes respectively for a plurality of transmitting apparatuses and receives data that the transmitting apparatuses transmit by using the specified modulation and coding schemes, the receiving apparatus comprising:
    a control unit that collects information on the amount of data to be transmitted by each transmitting apparatus and a transmission power level of each transmitting apparatus; calculates a total transmission power corresponding to each of a plurality of candidates for the modulation and coding schemes, based on the amount of data to be transmitted by each transmitting apparatus and the transmission power level of each transmitting apparatus; selects a modulation and coding scheme that minimizes the total transmission power, from among the candidates for the modulation and coding schemes; determines whether necessary resources are allocable for reception of the data to be transmitted from the transmitting apparatuses, based on the amount of the data to be transmitted and the selected modulation and coding schemes; and when the resources are unallocable, changes the currently selected modulation and coding scheme of at least one of the transmitting apparatuses to another modulation and coding scheme that transports a larger amount of data per unit resource than the currently selected modulation and coding scheme.

2. The receiving apparatus according to claim 1, wherein the control unit changes the modulation and coding schemes of the transmitting apparatuses whose transmission power levels are smaller than the others', when the resources are unallocable.

3. The receiving apparatus according to claim 1, wherein the control unit changes, when the resources are unallocable, the modulation and coding schemes by increasing the amount of transported data per unit resource in a stepwise manner, until the resources are found allocable.

4. The receiving apparatus according to claim 1, wherein the control unit changes, when the resources are unallocable, the modulation and coding scheme of at least one of the transmitting apparatuses to another modulation and coding scheme that transports a highest amount of data per unit resource, of all the modulation and coding schemes applicable to said at least one of the transmitting apparatuses.

5. A reception method for specifying modulation and coding schemes respectively for a plurality of transmitting apparatuses and receiving data that the transmitting apparatuses transmit by using the specified modulation and coding schemes, the reception method comprising:
    collecting information on the amount of data to be transmitted by each transmitting apparatus and a transmission power level of each transmitting apparatus;
    calculating a total transmission power corresponding to each of a plurality of candidates for the modulation and coding schemes, based on the amount of data to be transmitted by each transmitting apparatus and the transmission power level of each transmitting apparatus, and selecting a modulation and coding scheme that minimizes the total transmission power;
    determining whether necessary resources are allocable for reception of the data to be transmitted, based on the amount of the data to be transmitted and the selected modulation and coding schemes; and
    changing, when the resources are unallocable, the currently selected modulation and coding scheme of at least one of the transmitting apparatuses to another modulation and coding scheme that transports a larger amount of data per unit resource than the currently selected modulation and coding scheme.

* * * * *